United States Patent [19]

Boutni

[11] Patent Number: 4,743,650

[45] Date of Patent: May 10, 1988

[54] THERMOPLASTIC MOLDING BLENDS OF POLYCARBONATES AND POLYURETHANES

[75] Inventor: Omar M. Boutni, Mt. Vernon, Ind.

[73] Assignee: General Electric Company, Mt. Vernon, Ind.

[21] Appl. No.: 925,680

[22] Filed: Oct. 31, 1986

[51] Int. Cl.$^4$ ............................................. C08L 53/00
[52] U.S. Cl. ...................................... 525/92; 525/66; 525/67; 525/127; 525/131; 525/146; 525/148; 525/453; 525/454; 525/460
[58] Field of Search ................. 525/454, 467, 67, 146, 525/148, 464, 66, 92, 127, 131, 460, 901

[56] References Cited

U.S. PATENT DOCUMENTS

| | | | |
|---|---|---|---|
| 3,431,224 | 3/1969 | Goldblum | 524/42 X |
| 4,034,016 | 7/1977 | Baron et al. | 525/454 X |
| 4,569,970 | 2/1986 | Paul et al. | 525/67 |
| 4,638,033 | 1/1987 | Boutni et al. | 525/67 |

*Primary Examiner*—Theodore E. Pertilla
*Attorney, Agent, or Firm*—Joseph T. Eisele; Martin B. Barancik

[57] ABSTRACT

Thermoplastically moldable polycarbonate resins are improved by the blending therewith a thermoplastically moldable polyurethane characterized by high impact resistance, high flexural modulus, and a heat deflection temperature of at least 50° C. at 18.6 Kg/cm$^2$. Impact modifiers can also be present.

9 Claims, No Drawings

THERMOPLASTIC MOLDING BLENDS OF POLYCARBONATES AND POLYURETHANES

BACKGROUND OF THE INVENTION

1. Field of the Invention

The invention relates to synthetic polymeric resin compositions useful for thermoplastic molding and more particularly relates to a moldable blend of aromatic polycarbonates and polyurethanes.

2. Brief Description of the Prior Art

Aromatic polycarbonate resins are a well known class of synthetic polymeric resins, generally prepared by the reaction of a polyhydric phenol with a carbonate precursor; see for example U.S. Pat. No. 3,989,672. These resins, for the most part, are thermoplastic and readily molded under heat to fabricate a wide variety of articles such as automotive parts, tool housings and like structural components. The technique of molding and advantageous moldable compositions comprising the base polycarbonate in admixture with a wide variety of fillers, reinforcing agents, stabilizers, melt-viscosity modifiers, strength and impact modifiers, fire retardants, pigments and like additives are also well known. Representative of such moldable compositions are those described in the U.S. Pat. Nos. 3,431,224 and 4,481,331.

In spite of the numerous thermoplastic polycarbonate molding resin compositions known and available, there has remained a need for thermoplastic resin compositions meeting specific needs and from which articles of specific physical properties may be molded. For example, there is a need for polycarbonate resins which may be molded into engineering structural components having certain thickness specifications, impact resistance and resistance to hydrocarbon solvent degradation. These articles are of particular need in the automotive industry as components of automobiles.

However, polycarbonate based molding compositions have had restrictions on their use in molding thick-walled articles due to two inherent disadvantages.

The first disadvantage is the low critical thickness values of polycarbonates, i.e., the thickness at which a discontinuity in Izod impact values occurs. These low critical thickness values tend to limit wall thickness of molded polycarbonate to a thickness below the critical thickness. Polycarbonates exhibit notched Izod impact values which are dependent on the thickness of the polycarbonates. Thus, for example, while typical notched Izod impact values for a 3.2 mm thick polycarbonate test specimen are generally in the range of about 850 J/M, typical notched Izod impact values for a 6.4 mm thick polycarbonate test specimen are generally in the range of about 160 J/M. The high Izod values of the 3.2 mm thick polycarbonate test specimen are due to the fact that these specimens are thinner than the critical thickness of the polymer and, therefore, upon impact a ductile break occurs. The low Izod impact values of the 6.4 mm thick polycarbonate test specimens are due to the fact that these specimens exceed the critical thickness of the polymer and, therefore, upon impact a clean or brittle break occurs.

It has been proposed that this thickness sensitivity can be reduced by adding a small amount of a polyolefin, e.g., polyethylene, to the polycarbonate resin. While the addition of polyethylene has proven to be somewhat effective, in the main thick section notched Izod strengths are still not comparable to thin section strengths.

The compositions of the present invention solve this particular problem of the prior art in that they are moldable into articles having a thickness both above and below the critical thickness with useful impact resistance properties.

SUMMARY OF THE INVENTION

The invention comprises a thermoplastic molding composition, which comprises;
   a thermoplastic, aromatic polycarbonate; and
   a thermoplastic, polyurethane resin, characterized by high impact resistance, high flexural modulus, and a heat deflection temperature of at least 50° C. at 18.6 Kg/cm$^2$ which comprises the product of reaction of
     (a) an organic polyisocyanate;
     (b) an isocyanate-reactive material having an average functionality of at least 1.9, a glass transition temperature (Tg) of less than 20° C, and a molecular weight in the range of about 500 to about 20,000; and
     (c) at least one chain extender having a functionality from 2 to 3 and a molecular weight from about 50 to about 400;
   said polyurethane being further characterized in that the proportion by weight of said isocyanate-reactive material (b) in said polyurethane is from about 2 to about 25 percent and the overall ratio of isocyanate groups to active hydrogen groups in said reactants employed to prepare said polyurethane is in the range of 0.95:1 to about 1.05:1;
   said polycarbonate and said polyurethane being mixed together in a weight ratio of from about 65:35 to about 95:5 (polycarbonate:polyurethane).

The invention also comprises articles thermoplastically molded from the resins of the invention, such as structural components of automobile vehicles and the like. The articles of the invention resist attack by hydrocarbon solvents such as gasoline and the like and exhibit improved impact strength and a higher stress-crack resistance, over polycarbonate alone.

DETAILED DESCRIPTION OF THE PREFERRED EMBODIMENTS OF THE INVENTION

A wide variety of polycarbonate resins are known as are methods of their preparation, which are thermoplastically moldable. These polycarbonate resins may be prepared by the reaction of a polyhydric phenol with a carbonate precursor such as phosgene, a halo-formate or a carbonate ester. The method of preparation is described for example in U.S. Pat. No. 4,001,184 and 4,474,999, both of which are herein incorporated by reference.

In general, the polycarbonate resins are typified as possessing recurring structural units of the formula:

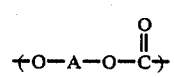

wherein A is a divalent aromatic moiety of the polyhydric phenol employed in the polymerization reaction. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis-(4-hydroxyphenyl)propane; hydroquinone; resorcinol; 2,2-bis-(4-hydroxyphenyl)pentane; 2,4'-(dihydroxyphenyl)methane; bis-(2-hydroxyphenyl)methane; bis-(4-hydroxyphenyl)methane; bis-(4-hydroxy-5-nitrophenyl)methane; 1,1-bis(4-hydroxyphenyl) ethane; 3,3-bis(4-hydroxyphenyl)pentane; 2,2-dihydroxydiphenyl; 2,6-dihydroxynaphthalene; bis-(4-hydroxydiphenyl) sulfone; bis-(3,5-diethyl-4-hydroxyphenyl)sulfone; 2,2-bis-(3,5-dimethyl-4-hydroxyphenyl))propane; 2,4'-dihydroxydiphenyl sulfone; 5'-chloro-2,4'-dihydroxydiphenyl sulfone; bis-(4- hydroxyphenyl)diphenyl sulfone; 4,4'-dihydroxydiphenyl ether; 4,4'-dihydroxy-3,3'-dichlorodiphenyl ether; 4,4'-dihydroxy-2,5-dihydroxydiphenyl ether; and the like.

A variety of additional dihydric phenols which may be employed to provide such carbonate polymers are disclosed in U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention.

The carbonate precursor may be either a carbonyl halide, a diaryl carbonate or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenol)-propane, 2,2-bis(4-hydroxy-3,5-dichlorophenol)propane, hydroquinone, and the like, or bis-haloformates of glycols such as bishaloformates of ethylene glycol, and the like. While all of the above carbonate precursors are useful, carbonyl chloride, also known as phosgene, is preferred.

Also included within the scope of the present invention are the use of high molecular weight thermoplastic randomly branched polycarbonates. These randomly branched polycarbonates are prepared by coreacting a polyfunctional organic compound with the aforedescribed dihydric phenol and carbonate precursor. Representative of the polyfunctional organic compounds useful in making the branched polycarbonates are set forth in U.S. Pat. Nos. 3,028,365; 3,334,154; 4,001,184; 4,131,575; all of which are hereby incorporated herein by reference thereto.

The polycarbonate resin components of the compositions of the invention are also represented by so-called "end-capped" polycarbonates. More specifically, it is known that in certain procedures of producing aromatic carbonate polymers from dihydric phenols and a carbonate precursor such as phosgene small amounts of certain molecular weight regulators or chain terminaters can be used to provide end or terminal groups of the carbonate polymer and thereby control the molecular weight of the polycarbonate.

A molecular weight regulator, i.e.; a chain stopper, is generally added to the reactants prior to or during the contacting of them with a carbonate precursor. Useful molecular weight regulators include, but are not limited to, monohydric phenols such as phenol, chroman-I, paratertiarybutylphenyl, and the like. Techniques for the control of molecular weight are well known in the art and may be used for controlling the molecular weight of the thermoplastic polycarbonate resins employed as components of the resins of the invention. The preferred aromatic carbonate polymer is homopolymer derived from 2,2-bis(4-hydroxyphenyl)propane (bisphenol A).

Preferably, the polycarbonate resin will have an intrinsic viscosity (as measured in methylene chloride at a temperature of 25° C) ranging from about 0.30 to about 1.00 deciliters/gram.

The thermoplastic polyurethane resin components of the compositions of the invention are characterized by high impact resistance, high flexural modulus, and a heat deflection temperature of a least 50° C at 18.6 Kg/cm$^2$, which polyurethane comprises the product of reaction of
  (a) an organic polyisocyanate;
  (b) an isocyanate-reactive material having an average functionality of at least 1.9, a glass transition temperature (Tg) of less than 20° C., and a molecular weight in the range of abut 500 to about 20,000; and
  (c) at least one chain extender having a functionality from 2 to 3 and a molecular weight from about 50 to about 400;
said polyurethane being further characterized in that the proportion by weight of said component (b) in said polyurethanes is from about 2 to about 25 percent and the overall ratio of isocyanate groups to active hydrogen groups in the reactants employed to prepare said polyurethanes is in the range of 0.95:1 to about 1.05:1.

By the term "high impact resistance" is meant an impact strength at ambient conditions (circa 20° C) of at least 50 J/M and preferably at least 160 J/M of notch as measured by the notched Izod test (ASTM D256-56).

The "heat deflection temperature" is a measure of the resistance of the polymer to deformation by heat and is the temperature (in ° C.) at which deformation of a specimen of the polyurethane of predetermined size and shape occurs when subjected to a flexural load of a stated amount (e.g. 18.6 Kg/cm$^2$).

The term "high flexural modulus" means a flexural modulus under ambient conditions of at least about 10500 Kg/cm$^2$ as measured by ASTM-D790.

The term "isocyanate-reactive material" means a compound (as hereinafter described and exemplified in detail) which contains groups such as hydroxy, mercapto, and amino which contain active hydrogen atoms and which therefore will enter into reaction with isocyanate groups. The term "average functionality of at least 1.9" means that said material contains an average of at least 1.9 such active hydrogen-containing groups per molecule.

The polyurethane may be prepared by any of the methods currently employed in the art using the reactants and the proportions set forth above. Preferably the polyurethanes are made by the one-shot procedure. In the case of the one-shot procedure, the non-cellular polyurethanes are made advantageously by preblending the isocyanate-active material (b) [hereinafter referred to as "component(b)" for the sake of convenience]and the extender (c) and feeding these to the reaction mixture as a single component, the other major component being the polyisocyanate. The mixing of the reactants can be accomplished by any of the procedures and apparatus conventional in the art. Preferably, the individual components are rendered substantially free from the presence of extraneous moisture using conventional procedures, for example by heating under reduced pressure at a temperature above the boiling point of water at the pressure employed. The mixing of the reactants can be carried out at ambient temperature (i.e. of the order of 20° to 25° C.) and the resulting mixture is then generally heated to a temperature of the order of about 40° C to about 130° C., preferably to a temperature of about 50° C. to about 100° C. Advantageously and preferably, one or more of the reactants is preheated to a temperature within the above ranges before the admixing is carried out. Advantageously, in a batch procedure, the heated reaction components, prior to admixture, are subjected to degassing in order to remove entrained bubbles of air or other gases before the reaction takes place. This is accomplished conveniently by reducing the pressure under which the components are maintained until no further evolution of bubbles occurs. The degassed reaction components are then admixed and transferred to suitable molds, extruders, flexible belts and the like and allowed to cure at temperatures of the order of ambient temperature to about 250° C. Pressure may also be applied during the curing reaction. The time required for curing will vary according to the temperature of curing and also with the nature of the particular composition. The time required in any given case can be determined by a process of trial and error.

It is advantageous to include a catalyst in the reaction mixture employed to prepare the polyurethanes. Any of the catalysts conventionally employed in the art to catalyze the reaction of an isocyanate with a reactive hydrogen containing compound can be employed for this purpose. A detailed listing of such catalysts is found, for example, in U.S. Pat. No. 4,202,957 at Column 5, lines 45 to 67. The amount of catalyst employed is generally within the range of about 0.02 to about 2.0 percent by weight based on the total weight of the reactants.

Any of the organic diisocyanates and polyisocyanates previously employed in the preparation of polyurethanes can be employed in preparing the polyurethane. Illustrative of such isocyanates are: methylenebis(phenyl isocyanate) including the 4,4'-isomer, the 2,4'-isomer and mixtures thereof, m- and p-phenylene diisocyanates, chlorophenylene diisocyanates, a,a'-xylylene diisocyanate, 2,4- and 2,6-toluene diisocyanate and the mixtures of these latter two isomers which are available commercially, tolidine diisocyanate, hexamethylene diisocyanate, and methylenebis(cyclohexyl isocyanate) including the 4,4'-isomer, the 2,4'-isomer and mixtures thereof. Preferably the organic polyisocyanate employed is methylenebis(phenyl isocyanate), in the forms of the 4,4'-isomer as well as mixtures of the 4,4'-isomer with amounts (up to about 70 percent by weight) of the 2,4'-isomer, and modified forms of this diisocyanate. By the latter are meant those form of methylenebis(phenyl isocyanate) which have been treated to render them stable liquids at ambient temperature (circa 20° C). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347.

The modified methylenebis(phenyl isocyanates) also include those which have been treated so as to convert a minor proportion of the diisocyanate to the corresponding carbodimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired.

The isocyanate-reactive materials ["component (b)"]employed in the preparation of the polyurethanes can be any of those previously known in the art in the preparation of polyurethanes, which materials contain active hydrogen groups and which also meet the criteria set forth above, namely, have a functionality of at least 1.9, a glass transition temperature (Tg) of less than 20° C., and a molecular weight in the range of about 500 to about 20,000. The glass transition temperature is a well-recognized property; see, for example, *Encyclopedia of Polymer Science and Technology*,Vol. 3, p. 620, Interscience Publishers, New York, 1965.

As set forth above the proportion of isocyanate-reactive material employed in the preparation of the polyurethane can be within the range of about 2 to 25 percent by weight. Preferably the proportion is in the range of 4 to 15 percent by weight and most preferably is in the range of 4 to 10 percent by weight.

Exemplary of isocyanate-reactive materials which can be employed in the preparation of the polyurethanes are: polyether polyols, polyester polyols, amine-terminated polycarbonates, hydroxy-terminated polybutadienes, hydroxy-terminated polybutadiene-acrylonitrile copolymers, amino-terminated polybutadiene-acrylonitrile copolymers, hydroxy-terminated copolymers of dialkyl siloxane and alkylene oxides such as ethylene oxide, propylene oxide and the like, provided that all of said compounds also meet the criteria of Tg, molecular weight and functionality listed above. Preferably the molecular weights of the materials are within the range of about 1200 to about 10,000 and, most preferably, in the range of about 2000 to about 8000. The functionality of these materials is advantageously not greater than about 6 and, preferably, the functionality is in the range of about 2 to 4.

Illustrative of polyether polyols are polyoxyethylene glycols, polyoxypropylene glycols which, optionally, have been capped with ethylene oxide residues, random and block copolymers of ethylene oxide and propylene oxide, propoxylated tri- and tetrahydric alcohols such as glycerine, trimethylolpropane, pentaerythritol, and the like, which propoxylated compounds have been capped with ethylene oxide; polytetramethylene glycol, random and block copolymers of tetrahydrofuran and ethylene oxide and or propylene oxide, and products derived from any of the above by reaction with di- or higher functional carboxylic acids or esters derived from said acids in which latter case ester interchange occurs and the esterifying radicals are replaced by polyether polyol radicals. Advantageously, the polyether polyols employed as component (b) in the polyurethanes have a primary hydroxyl group content of at least 80 percent. The preferred polyether polyols are random and block copolymers of ethylene and propylene oxide of functionality approximately 3.0 and polytetramethylene glycol polymers of functionality greater than or equal to 2.0.

The component (b) which is employed may also be a polyol obtained by reacting any of the above polyether polyols with a di- or trifunctional aliphatic or aromatic carboxylic acid to form the corresponding polyether-esters. Examples of acids which can be used are adipic, azelaic, glutaric, isophthalic, terephthalic, trimellitic and the like.

The polyether polyols which can be employed as component (b) also include the vinyl reinforced polyether polyols, e.g. those obtained by the polymerization of styrene and/or acrylonitrile in the presence of the polyether.

Illustrative of polyester polyols are those prepared by polymerizing α-caprolactone using an initiator such as ethylene glycol, ethanolamine and the like, and those prepared by esterification of polycarboxylic acids such as phthalic, terephthalic, succinic, glutaric, adipic, azelaic and the like acids with polyhydric alcohols such as ethylene glycol, butanediol, glycerol, trimethylpropane, 1,2,6-hexanetriol, cyclohexanedimethanol and the like. A preferred group of polyesters are those obtained by esterifying a dimeric or trimeric fatty acid, optionally mixed with a monomeric fatty acid, such as oleic acid, with a relatively long chain aliphatic diol such as hexane-1,6-diol and the like.

Illustrative of the amine-terminated polyethers are the aliphatic primary di- and tri-amines structurally derived from polyoxypropylene glycols and triols and having structures represented by

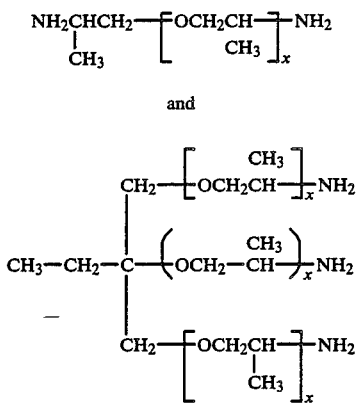

and wherein X is such that the polyether has a molecular weight of circa 1200–10,000. Polyether diamines of this type are available from Jefferson Chemical Company under the trademark JAFFAMINE.

Illustrative of polycarbonates containing hydroxyl groups are those prepared by reaction of diols such as propane-1,3-diol, butane-1,4-diol, hexane-1,6-diol, diethylene glycol, triethylene glycol, dipropylene glycol and the like with diacrylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the hydroxy-terminated poly-butadiene copolymers are the compounds available under the trade name Poly BD Liquid Resins from Arco Chemical Company. Illustrative of the hydroxy- and amine-terminated butadiene/acrylonitrile copolymers are the materials available under the trade name HYCAR hydroxyl-terminated (HT) Liquid Polymers and amineterminated (AT) Liquid Polymers, respectively.

The extenders which are used in preparing the polyurethanes are inclusive of aliphatic straight and branched chain diols, including cyclo aliphatic diols, preferably having from about 2 to 8 carbon atoms, inclusive, in the chain. Illustrative of such diols are ethylene glycol, 1,3-propanediol 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,4-cyclohexanedimethanol, and the like including mixtures of two or more such diols. The extenders, which can be used alone or in admixture with each other or any of the above diols, also include diethylene glycol, dipropylene glycol, tripropylene glycol, ethanolamine, N-methyldiethanol-amine, N-ethyl-diethanolamine, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes are the adducts obtained by reaction of an aliphatic diol or triol such as 1,4-cyclohexanedimethanol, neopentyl glycol, hexane-1,2-diol, ethylene glycol, butane-1,4-diol, trimethylolpropane and the like with a α-caprolactone in a mole ratio of from 0.01 to 2 moles of caprolactone per mole or diol or triol.

The thermoplastic polyurethane resins are preferably obtained by employing substantially difunctional polyisocyanates and difunctional extenders and a component (b) having a functionality preferably not exceeding about 4, although polyols having higher functionalities can be employed where the weight proportion employed is in the lower level of the ranges set forth above. Since the amount by weight of the component (b) employed is relatively small, it is possible to employ such components having functionalities greater than two without detracting from the thermoplasticity of the resulting product. However, there is a limit on the degree to which the functionality of the component (b) can be increased without losing thermoplastic properties in the resulting product. As will be recognized by one skilled in the art, this limit will vary according to the nature of the component (b), its molecular weight, and the amount in which it is used within the ranges set forth above. In general, the higher the molecular weight of the component (b) the higher the functionality which can be employed without losing the thermoplastic properties in the polyurethane product.

Further, although in general it is desirable to employ a substantially pure diisocyanate, i.e. polyisocyanate free from isocyanates of functionality greater than 2.0, in order to prepare the thermoplastic polyurethanes, certain modified methylenebis(phenyl isocyanates) can be employed without detracting from the desired properties. In particular, it is found that a methylenebis(phenyl isocyanate) which has been converted to a stable liquid as described above by reaction with a minor amount of one or more glycols of low molecular weight can give the desired thermoplastic properties in combination with a difunctional extender as described above. In addition, methylenebis(phenyl isocyanate) can be used in admixture with minor proportions, up to about 25 percent by weight, of other modified liquid methylenebis(phenyl isocyanates) such as those described above in which a portion of the diisocyanate has been converted to carbodiimide. However, in general it is not possible to utilize the latter type of isocyanate itself without the admixture with major proportions of methylenebis(phenyl isocyanate) and still obtain thermoplastic polyurethanes.

While any of the diol extenders described and exemplified above can be employed in preparing the thermoplastic polyurethanes alone, or in admixture, it is preferred to use 1,4-butanediol, neopentyl glycol, 1,4-cyclohexanedimethanol, ethylene glycol, and diethylene glycol either alone or in admixture with each other or with one or more aliphatic diols previously named.

Generally, the polycarbonate resin comprises from 65 to 95 parts by weight of the compositions and the articles of the invention, preferably 75 to 90 parts, most preferably 85 to 90 parts.

The method of the invention may be carried out by a homogeneous blending of the polycarbonate with the polyurethane. The blending may be carried out by adding the two resins together and mixing the two components with conventional technique and apparatus. In general, the mixtures may be blended by pre-mixing in conventional mixing rolls, dough mixers, Banbury mixers and the like and blending the pre-mix in an extruder or fluxing it on a mill at an elevated temperature sufficient to achieve a melt blending. Upon cooling, the blend may be pelletized and stored for use.

The thermoplastic molding resin compositions of the instant invention may also optionally contain various commonly known and used additives such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as a phosphite; flame retardants; and mold release agents.

Some particularly useful flame retardants are the alkali and alkaline earth metal salts of sulfonic acids. These type of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated by reference.

The resin compositions of the invention may be thermoplastically molded using conventional techniques and apparatus; for example by compression, injection, calendering, extrusion and like techniques.

In preferred compositions of the invention (preferred for molding both relatively thick and thin articles), a conventional and known impact modifier for a polycarbonate resin is added to the compositions of the invention in an impact-modifying proportion.

Representative of such known impact modifiers are selectively hydrogenated linear, sequential or radial teleblock copolymers of a vinyl aromatic compound (A) and (A')$_n$ and an olefinic elastomer (B) of the A-B-A'; A (B-A-B)$_n$A; A (B-A)$_n$B; or B [(A-B$_n$) B]$_4$ type wherein n is an integer of from 1 to 10, inclusive. These copolymers may be prepared by known methods; see the description given in U.S. Pat. No. 4,481,331. Commercially available copolymers include for example Kraton G ®-1650 and Kraton G ®-1651 available from Shell Chemical Company. The Kraton G ® has a significant quantity of the residual aliphatic unsaturation removed by selective hydrogenation.

Also commercially available are the Solprenes manufactured by Phillips Petroleum Company.

The radial teleblock copolymers of which the Solprenes are typical examples can be characterized as having at least three polymer branches with each branch of the radial block polymer comprising terminal non-elastomeric segments, e.g. (A) and (A') as defined hereinabove. The branches of the radial block polymer contain a terminal non-elastomeric segment attached to an elastomeric polymer segment, e.g., (B) as defined above. These are described in U.S. Pat. No. 3,753,936 and in U.S. Pat. No. 3,281,383, both of which are incorporated herein by reference, and they are selectively hydrogenated by procedures known per se. In any event, the term "selective hydrogenation" is used herein to contemplate polymers in which the elastomeric blocks (A) and (A') have been left unhydrogenated, i.e., aromatic.

Further examples of impact modifiers advantageously added to the compositions of the invention are the polyolefins and the acrylate copolymers, particularly the core shell polymers such as Rohm and Haas Acryloid KM330; see U.S. Pat. No. 4,096,202.

Also useful as impact modifiers are alkenyl aromatic resins. The alkenyl aromatic resin is a polymer having at least a portion of its units derived from an alkenyl aromatic monomer such as styrene, α-methylstyrene, p-methylstyrene, tert-butyl styrene, bromo-styrene, chlorostyrene, dimethylstyrene, p-methyl-α-methylstyrene, p-chloro-α-methylstyrene, vinyl xylene, vinyl naphthalene and vinyl toluene.

Specific examples of alkenyl aromatic monomers include styrene, chlorostyrene, bromostyrene, alphamethylstyrene, vinyl xylene, vinyl naphthalene and p-methyl styrene.

The alkenyl aromatic resin may be modified with a rubber. The term "rubber" as used in this disclosure is meant to encompass both natural and synthetic forms, and to include polyurethane rubber, ethylene/vinyl acetate rubber, silicone rubber, polyether rubber, polypentenamer rubber and ethylene-propylene-diene rubber; diene rubbers, i.e., homopolymers of conjugated dienes having e.g., 4 to 8 carbon atoms, such as butadiene, isoprene, piperylene and chloroprene; and copolymers of dienes with each other or with styrene, acrylic acid, methacrylic acid, or derivatives thereof (e.g., acrylonitrile, methacrylonitrile, acrylic acid, methacrylic acid, butyl acrylate and methyl methacrylate), or isobutylene. Preferably, the rubber is selected from among butadiene, butadiene/styrene, butadiene/methyl methacrylate, butadiene/butyl acrylate, ethylene/propylene/diene, polypentanamer and butadiene/acrylonitrile rubbers.

An example of a preferred impact modifier for use in the present invention is an EPDM rubber modified polystyrene resin. The term "EPDM" is used in the art to designate rubbery interpolymers of a mixture of monoolefins and a polyene. Preferred types for use in the practice of this invention comprise from about 10 to about 90 mole percent of ethylene, from about 10 to about 90 mole percent of an alpha olefin having 3 to 10 carbon atoms, and from 0.1 to about 10 mole percent of a non-conjugated cyclic or open-chain diene having from 4 to 20 carbon atoms. In the most preferred embodiments, the rubbery interpolymer is derived from ethylene, propylene and a diene selected from 1,4-ethylidene-hexadiene, dicyclopentadiene, and especially, 5-ethylidene-2-norbornene.

The alkenyl aromatic resin that is modified with a rubbery interpolymer may be prepared by dissolving the rubbery interpolymer in the alkenyl aromatic monomer and polymerizing the mixture in the presence of a free radical initiator until 90–100% by weight of the alkenyl aromatic monomer has reacted to form said modified alkenyl aromatic resin. These materials are commercially available, such as the product Taflite 925-01 which is a suspension polymerized EPDM modified, high impact polystyrene that contains about 12% of benzene insoluble rubber and the average rubber particle size is about 8–10 microns. The EPDM component is an ethylene-propylene-ethylidene-norbornene terpolymer.

Rubber modified polystyrenes containing smaller rubber particles may also be used, such as those described in U.S. Pat. No. 4,101,504 (EPDM rubber particles having a median diameter of less than about 2 microns).

The preferred modified alkenyl aromatic resins are those made with an EPDM rubbery interpolymer of ethylene, propylene and 5-ethylidene-2-norbornene and styrene. Preferred modified alkenyl aromatic resins will include from about 5 to about 20% by weight of rubber interpolymer.

Further examples of impact modifiers which may be added to the compositions of the invention are copolymers made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred copolymer is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite ® DPD-6169 ethylene-ethyl acrylate copolymer is advantageous for use in the present invention.

Methods for the preparation of these polymers, both commercial and non-commercial, are abundantly described in the literature and known to those skilled in the art.

An impact-modifying proportion of the known impact modifiers described above is generally within the range of from about 0.05 to 15 parts by weight of the composition, preferably from 3–10 parts, most preferably 4 to 8 parts.

The following examples describe the manner and process of making and using the invention and set forth the best mode contemplated by the inventor for carrying out the invention but are not to be construed as limiting the scope of the invention. All parts are by weight. Test results are in accordance with the following test methods.

Hydrocarbon Solvent Resistance

The resistance is determined by subjecting specimens to gasoline soaking and then measuring their impact strengths with special attention to the mode of failure, ductile failure being preferable. The specimens are ASTM D-256 impact test bars of two sizes: 5.715 cm × 1.27 cm in two thicknesses (3.2 mm and 6.4 mm). The 3.2 mm bars are mounted on a strain jig and are soaked 24 hours at room temperature in AMOCO ® unleaded premium grade gasoline at a stress of 239 Kg/cm². They are then dried for 24 hours. Izod impact strengths are then determined according to ASTM D-256 procedures on notched specimens.

Intrinsic Viscosity

The intrinsic viscosity of polycarbonate resins was measured at a temperature of 25° C in methylene chloride and is reported in deciliters/ gram (dl/g).

Deflection Temperature Under Load (DTUL)

ASTM test method D-648–56 at a load of 18.6 Kg/cm².

Notched Izod Impact Strength

ASTM test method D-256; all specimens were 100% ductile at failure, unless otherwise noted.

Tensile Strength and Elongation

ASTM test method D-638.

Flexural Modulus

ASTM test method D-790.

EXAMPLE 1

A polycarbonate (PC) prepared by the reaction of phosgene and bisphenol-A and having an intrinsic viscosity of from about 0.46 to about 0.49 deciliters/gram (dl/g) (LEXAN ® resin 140; General Electric Co., Mount Vernon, IN.) was provided. Aliquots of the resin provided were blended with proportions of a thermoplastic polyurethane engineering resin (TPU) prepared from methylene bis isocyanate and a 6000 M.W. polyether triol, an average functionality of at least 1.9, a glass transition temperature (Tg) of less than 20° C., and a diol extender having a functionality from 2 to 3 and a molecular weight from about 50 to about 400 in accordance with the method described in U.S. Pat. No. 4,376,834. The polyurethane is characterized in part by the following representative physical properties: (Test pieces molded and exposed to ambient conditions 7 days before test.)

| PROPERTIES | REPRESENTATIVE VALUES |
|---|---|
| DTUL (°C.) | Above 50° C. at 18.6 Kg/cm² |
| Tensile Strength (MPa) | |
| @ Yield | 52.4 |
| @ Break | 58.6 |
| Elongation (%) | |
| @ Yield | 6 |
| @ Break | 180 |
| Flexural Modulus (MPa) | |
| @ 23° C. | 1620 |
| −7° C. | 1720 |
| −23° C. | 1930 |
| Izod Impact (notched) (J/M) 3.175 mm Thickness | |
| @ 23° C. | 1175 |
| −29° C. | 320 |
| −40° C. | 160 |
| 6.35 mm Thickness | |
| @ 23° C. | 855 |
| −29° C. | 278 |
| −40° C. | 139 |

The mixtures were uniformly blended together in a laboratory tumbler with or without added impact modifiers and the blend extruded at 246° C. The extrudate was pelletized and the pellets were fed to an injection molding machine which molded test bars at 271° C. The moldings were subjected to tests to determine their physical properties. The blend components and the test results are set forth below in the TABLE 1.

TABLE 1

|  | 1 | 2 | 3 | 4 | 5 | 6 | 7 | 8 | 9 |
|---|---|---|---|---|---|---|---|---|---|
| BLEND COMPONENTS (PARTS) | | | | | | | | | |
| LEXAN 145 | 80 | 92 | 92 | 80 | 92 | 92 | 90 | 95 | 100 |
| TPU | 20 | 4 | 4 | 10 | 4 | 4 | 10 | 5 | — |
| KM330$^a$ | — | — | 4 | 10 | — | — | — | — | — |
| DPD-6169$^b$ | — | 4 | — | — | — | — | — | — | — |
| LLDPE$^c$ | — | — | — | — | 4 | — | — | — | — |
| LR-3320$^d$ | — | — | — | — | — | 4 | — | — | — |
| NOTCHED IZOD IMPACT STRENGTH (Kg. cm/cm) | | | | | | | | | |
| 3.2 mm N Izod | 12.5$^{60}$ | 74.0 | 82.3 | 80.5 | 84.9 | 84.9 | 7.1$^0$ | 10.9$^0$ | 65.3 |
| 6.4 mm N Izod | 7.1$^0$ | 36.4$^{40}$ | 70.7 | 53.3 | 59.3 | 19.0$^0$ | 7.6$^0$ | 7.6$^0$ | 12.5$^0$ |
| 3.2 mm N Izod After gasoline exposure | 3.8$^0$ | 3.8$^0$ | 3.8$^0$ | 8.7$^0$ | 4.9$^0$ | 3.8$^0$ | — | — | Broke in jar |
| Weld Line Strength (unnotched) | 12.5$^0$ | 15.8$^0$ | 100.6$^{60}$ | 15.8$^0$ | 19.0$^{40}$ | 49.5$^{20}$ | 53.3$^0$ | 193.7$^{80}$ | 217 |
| HDT °C. 18.5 Kg/cm$^2$ | 119 | 125 | 129.6 | 121.1 | 124.3 | 121.7 | 118.3 | 122.4 | 132 |

$^a$Acryloid KM330; an acrylate copolymer prepared as described in U.S. Pat. No. 4,096;202; Rohm and Haas Corporation.
$^b$Ethylene-ethyl acrylate copolymer; Union Carbide, Bakelite ® DPD-6169.
$^c$Linear low density polyethylene, LPX-15; Exxon.
$^d$LR resin, organopolysiloxane-polycarbonate block copolymer; General Electric Company.
$^e$Exposed for 24 hours under 239 Kg/cm' of stress.
(168.7 Kg/cm$^2$)
After gasoline    2.3  2.9  18.5  2.9  3.5  9.1  9.8  35.6
exposure
On Weld line
*(IDENTIFY)

What is claimed is:

1. A thermoplastic resin composition, which consists essentially of;
    a thermoplastic, aromatic polycarbonate; and
    a thermoplastic, polyurethane resin, characterized by high impact resistance, high flexural modulus, and a heat deflection temperature of at least 50° C. at 18.6 kg/cm$^2$ which comprises the product of reaction of
    (a) methylenebis (phyenyl isocyanate);
    (b) a polyether triol having an average functionality of at least 1.9, a glass transition temperature (Tg) of less than 20° C., and a molecular weight in the range of about 500 to about 20,000; and
    (c) at least one chain extender having a functionality from 2 to 3 and a molecular weight from about 50 to about 400; said polyurethane being further characterized in that the proportion by weight of said polyether triol (b) in said polyurethane is from about 2 to about 25 percent and the overall ratio of isocyanate groups to active hydrogen groups in said reactants employed to prepare said polyurethane is in the range of 0.95:1 to about 1.05:1; said polycarbonate and said polyurethane in admixture together in a weight ratio of from about 65:35 to about 95:5 (polycarbonate: polyurethane).

2. A resin mixture as defined in claim 1 wherein the aromatic carbonate polymer comprises recurring structural units of the formula:

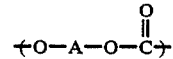

wherein A is a divalent aromatic radical of a dihydric phenol.

3. The composition of claim 1 which further consists essentially of an impact modifying proportion of a compound which is an impact resistance modifier.

4. The composition of claim 3 wherein the modifier is a selectively hydrogenated linear, sequential, or radial teleblock copolymer resin of a vinyl aromatic compound (A)$_n$ and (A')$_n$ and an olefinic elastomer (B), of the A-B-A'; A-(B-A-B)$_n$-A; A(-BA)$_n$B; (A)$_4$B; B(A)$_4$; or B((AB)$_n$B)$_4$ type, wherein n is an integer of from 1 to 10.

5. The composition of claim 3 wherein the modifier is a copolymer of an olefin and at least one of a C$_1$–C$_6$ alkyl acrylate, a C$_1$–C$_6$ aklyl methacrylate, acrylic acid, methacrylic acid, or mixtures of any of the foregoing.

6. The composition of claim 5 wherein the modifier is a copolymer of ethylene and ethyl acrylate.

7. The composition of claim 3 wherein the modifier is a polyolefin resin.

8. The composition of claim 7 wherein the modifier is a linear low density polyethylene.

9. The composition of claim 3 wherein the modifier is an organopolysiloxane-polycarbonate block copolymer.

* * * * *